United States Patent
Yamashita et al.

(10) Patent No.: US 8,947,352 B2
(45) Date of Patent: Feb. 3, 2015

(54) IMAGE PROCESSING APPARATUS CAPABLE OF DISPLAYING OPERATION ITEM, METHOD OF CONTROLLING THE SAME, IMAGE PICKUP APPARATUS, AND STORAGE MEDIUM

(75) Inventors: Masahiro Yamashita, Kawasaki (JP); Yuji Koide, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 275 days.

(21) Appl. No.: 13/453,437

(22) Filed: Apr. 23, 2012

(65) Prior Publication Data

US 2012/0306738 A1 Dec. 6, 2012

(30) Foreign Application Priority Data

May 30, 2011 (JP) ................................ 2011-120341

(51) Int. Cl.
- *G09G 5/00* (2006.01)
- *G06F 3/041* (2006.01)
- *G06F 3/0482* (2013.01)
- *G06F 3/0481* (2013.01)

(52) U.S. Cl.
CPC .............. *G06F 3/041* (2013.01); *G06F 3/0482* (2013.01); *G06F 3/04817* (2013.01); *G06F 2203/04101* (2013.01); *G06F 2203/04804* (2013.01); *G09G 2354/00* (2013.01)
USPC ....................................................... 345/156

(58) Field of Classification Search
USPC .......................... 345/156–157, 173–177, 179; 178/18.01, 18.04–18.07, 18.09, 19.01
See application file for complete search history.

(56) References Cited

U.S. PATENT DOCUMENTS

| | | | |
|---|---|---|---|
| 7,002,556 B2 * | 2/2006 | Tsukada et al. | 345/173 |
| 2002/0196238 A1 * | 12/2002 | Tsukada et al. | 345/173 |
| 2008/0122798 A1 * | 5/2008 | Koshiyama et al. | 345/173 |
| 2009/0058829 A1 * | 3/2009 | Kim et al. | 345/173 |
| 2009/0251423 A1 * | 10/2009 | Jung | 345/173 |
| 2011/0128234 A1 * | 6/2011 | Lipman et al. | 345/173 |
| 2012/0019562 A1 * | 1/2012 | Park et al. | 345/657 |
| 2012/0154307 A1 * | 6/2012 | Nunomaki | 345/173 |
| 2013/0093860 A1 * | 4/2013 | Shimotani et al. | 348/51 |

FOREIGN PATENT DOCUMENTS

| | | |
|---|---|---|
| JP | 10-105735 | 4/1998 |
| JP | 2006-236143 | 9/2006 |

* cited by examiner

*Primary Examiner* — Rodney Amadiz
(74) *Attorney, Agent, or Firm* — Cowan, Liebowitz & Latman, P.C.

(57) ABSTRACT

An image processing apparatus which is capable of preventing the display of an operation item, such as an icon, from hindering user's viewing an image which the user desires to view. A distance and position-detecting section and a system controller detect a distance between a screen and an operation element. The system controller displays at least one operation candidate item on the screen when the detected distance becomes not larger than a first threshold distance. Further, when the detected distance becomes not larger than the first predetermined threshold distance, the system controller changes a display form of the operation candidate item depending on the detected distance and displays the operation candidate item as an operable item.

7 Claims, 11 Drawing Sheets

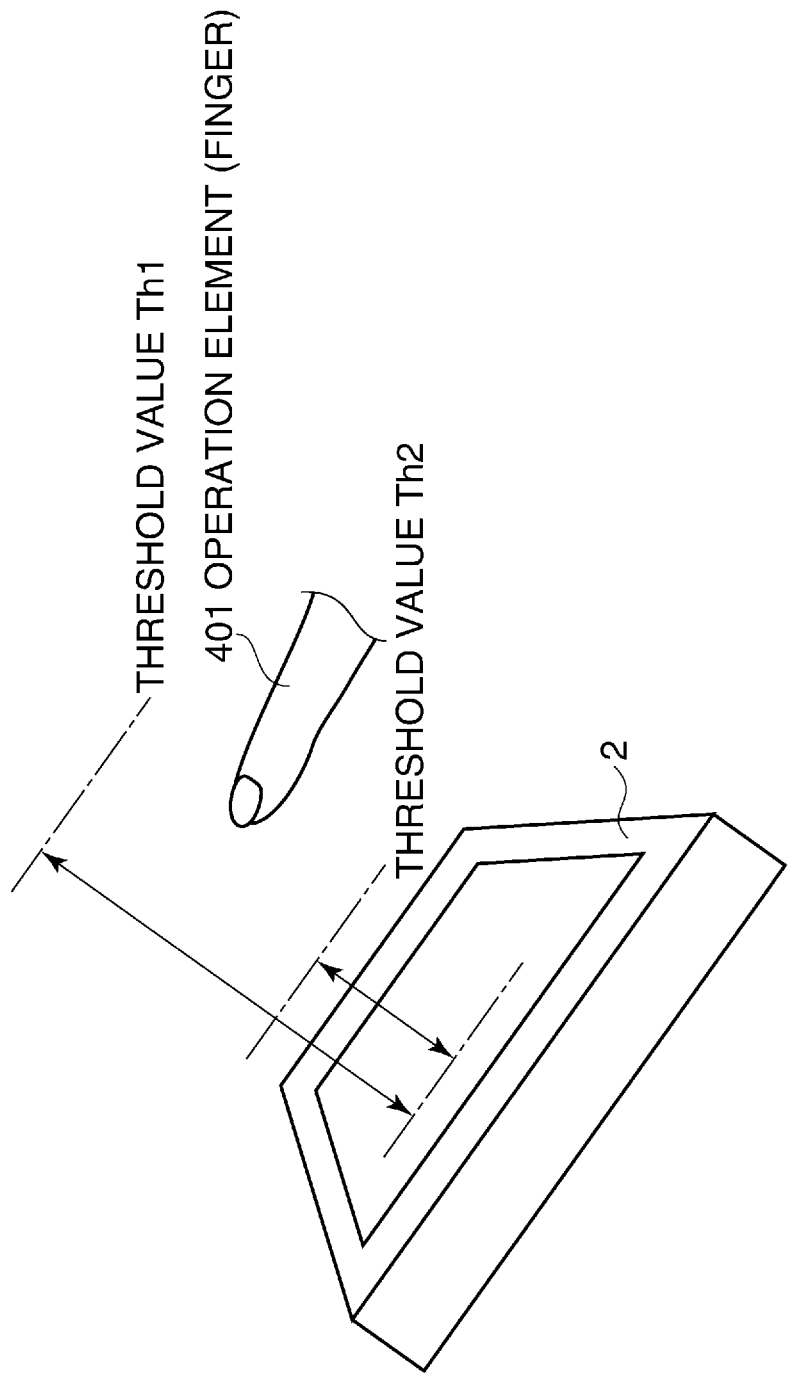

FIG. 9A
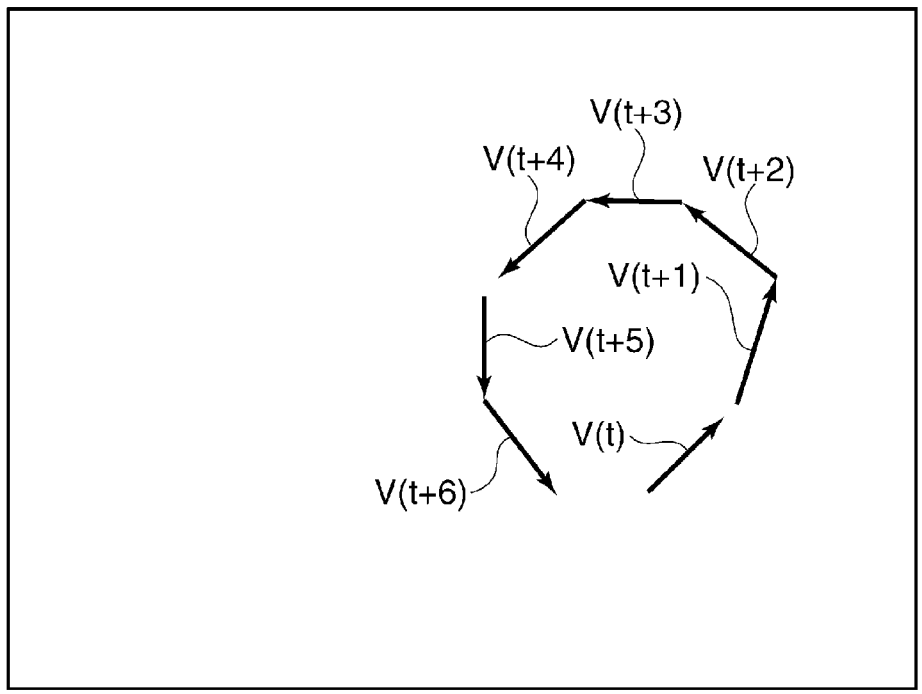
FIG. 9B    FIG. 9C    FIG. 9D    FIG. 9E
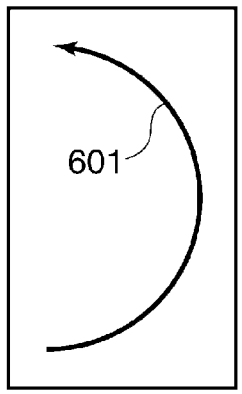 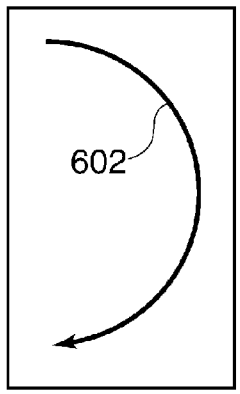 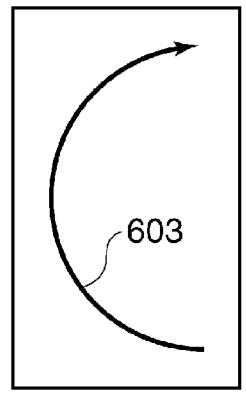 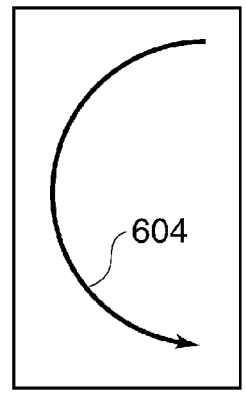

IMAGE PROCESSING APPARATUS CAPABLE OF DISPLAYING OPERATION ITEM, METHOD OF CONTROLLING THE SAME, IMAGE PICKUP APPARATUS, AND STORAGE MEDIUM

BACKGROUND OF THE INVENTION

1. Field of the Invention

The present invention relates to an image processing apparatus, a method of controlling the same, an image pickup apparatus, and a storage medium, and more particularly to a method of switching screen display according to the positional relationship between the image pickup apparatus and an operation element, such as a finger.

2. Description of the Related Art

Conventionally, some of image processing apparatuses each incorporated in an image pickup apparatus, such as a digital camera, are configured to display an operable element image (operation item) on a touch panel and change a display state of a screen according to a user's operation when the user's operation is performed on the operable element image (see Japanese Patent Laid-Open Publication No. H10-105735).

Further, there has been proposed an image processing apparatus which is configured to predict an icon that a user is about to select from a plurality of icons displayed on a display section, before the user's operation, and display the icon in an enlarged size (see Japanese Patent Laid-Open Publication No. 2006-236143).

By the way, in a case where an operation item, such as an icon, is always displayed on the touch panel, when an image is displayed on the touch panel, for example, the operation item overlaps the image. This hinders the user from viewing the image.

Further, although the user has no intention of touching the operation item on the touch panel, user's touching on the operation item is sometimes detected by the image processing apparatus, and it is determined a user's operation has been performed. In this case, an operation responsive to the user's operation is executed though not desired by the user.

SUMMARY OF THE INVENTION

The present invention provides an image processing apparatus which is capable of preventing the display of an operation item, such as an icon, from hindering user's viewing an image which the user desires to view, a method of controlling the image processing apparatus, an image pickup apparatus, and a storage medium.

Further, the present invention provides an image processing apparatus which is capable of preventing a user's inadvertent operation of the operation item from leading to execution of processing not desired by the user, a method of controlling the image processing apparatus, a control program, and an image pickup apparatus.

In a first aspect of the present invention, there is provided an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, comprising a distance detection unit configured to detect a distance between the screen and the operation element to obtain a detected distance, a first display control unit configured to display at least one operation candidate item on the screen when the detected distance becomes not larger than a first predetermined threshold distance, and a second display control unit configured to be operable when the detected distance becomes not larger than the first predetermined threshold distance, to change a display form of the operation candidate item depending on the detected distance and display the operation candidate item as an operable item.

In a second aspect of the present invention, there is provided an image pickup apparatus comprising an image pickup unit configured to pick up an object to acquire image data of the object, and an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, wherein the image processing apparatus comprises a distance detection unit configured to detect a distance between the screen and the operation element to obtain a detected distance, a first display control unit configured to display at least one operation candidate item on the screen when the detected distance becomes not larger than a first predetermined threshold distance, and a second display control unit configured to be operable when the detected distance becomes not larger than the first predetermined threshold distance, to change a display form of the operation candidate item depending on the detected distance and display the operation candidate item as an operable item.

In a third aspect of the present invention, there is provided a method of controlling an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, comprising detecting a distance between the screen and the operation element by a detection sensor to obtain a detected distance, displaying at least one operation candidate item on the screen when the detected distance becomes not larger than a first predetermined threshold distance, and changing, when the detected distance becomes not larger than the first predetermined threshold distance, a display form of the operation candidate item depending on the detected distance and displaying the operation candidate item as an operable item.

In a fourth aspect of the present invention, there is provided a non-transitory computer-readable storage medium storing a computer-executable control program for causing a computer to execute a method of controlling an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, wherein the method comprises detecting a distance between the screen and the operation element by a detection sensor to obtain a detected distance, displaying at least one operation candidate item on the screen when the detected distance becomes not larger than a first predetermined threshold distance, and changing, when the detected distance becomes not larger than the first predetermined threshold distance, a display form of the operation candidate item depending on the detected distance and displaying the operation candidate item as an operable item.

According to the present invention, when a user intends to view an image, the display of an operation item is prevented from hindering user's viewing of the image, and further a user's inadvertent operation of the operation item is prevented from leading to execution of processing not desired by the user.

Further features of the present invention will become apparent from the following description of exemplary embodiments with reference to the attached drawings.

BRIEF DESCRIPTION OF THE DRAWINGS

FIGS. 2A and 2B are views useful in explaining a naked-eye stereoscopic vision on the display section illustrated in FIG. 1, in which FIG. 2A illustrates a parallax barrier method, and FIG. 2B illustrates a lenticular method.

FIGS. 6A to 6C are views useful in explaining examples of images displayed on a display section appearing in FIG. 3, in which FIG. 6A shows a display image displayed on the display section, FIG. 6B shows a state in which an operation candidate item is displayed in a manner superimposed on the display image, and FIG. 6C shows a state in which an operable display has been performed on the display section.

FIG. 8 is a perspective view showing the distance between the display section illustrated in FIG. 1 and an operation element.

FIGS. 9A to 9E are views useful in explaining detection of a motion of the operation element by a non-contact operation-detecting section appearing in FIG. 3, in which FIG. 9A shows a trajectory of the operation element over a predetermined time period, and FIGS. 9B to 9E show examples of trajectory data for operation instructions.

FIGS. 10A to 10C are views useful in explaining an example of a display process for displaying an image on a display section of a digital camera according to a second embodiment of the present invention, in which FIG. 10A shows a state in which the image is displayed on the display section, FIG. 10B shows a state in which the operation element is approaching a screen, and FIG. 10C shows a state in which the operation element has approached the screen.

FIGS. 11A to 11C are views useful in explaining another example of the display process for displaying an image on the display section of the digital camera according to the second embodiment, in which FIG. 11A shows a state in which the image is displayed on the display section, FIG. 11B shows a state in which the operation element is approaching the screen, and FIG. 11C shows a state in which the operation element has approached the screen.

DESCRIPTION OF THE EMBODIMENTS

The present invention will now be described in detail below with reference to the accompanying drawings showing embodiments thereof.

Figure 1:
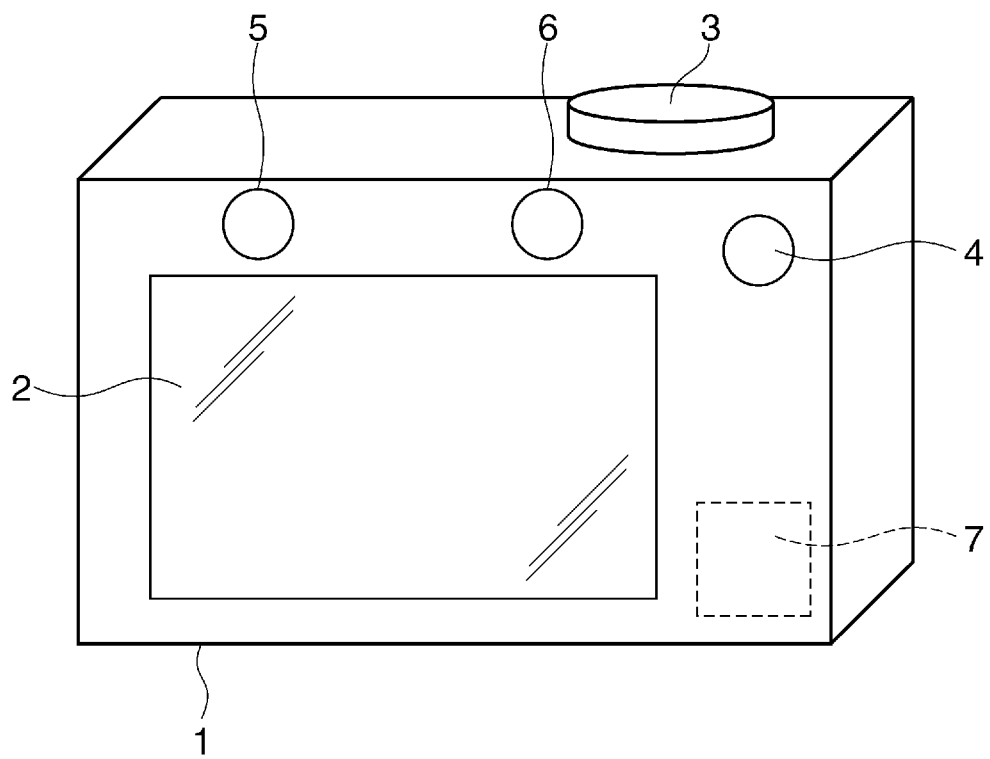
FIG. 1 is a perspective view of the appearance of a digital camera, as viewed from the rear thereof, which is one of an image pickup apparatus to which is applied an image processing apparatus according to a first embodiment of the present invention.

FIG. 1 is a perspective view of the appearance of a digital camera, as viewed from the rear thereof, which is an image pickup apparatus to which is applied an image processing apparatus according to a first embodiment of the present invention.

In the illustrated digital camera 1, a display section 2 is disposed on the rear side of a housing of the digital camera 1. The display section 2 displays images and various kinds of information. A shutter button 3 is disposed on the top of the camera housing and a shooting instruction is given by operating the shutter button 3.

A power switch 4, a operation input image pickup section (L) 5, and a second operation input image pickup section (R) 6 are arranged on the rear side of the camera housing, and a storage medium 7 is accommodated in the camera housing, as indicated by a one-dot chain line block.

The power of the digital camera 1 is turned on or off by operating the power switch 4. The operation input image pickup section (L) 5 and the operation input image pickup section (R) 6 are for picking up the position and the operation of an operation element, such as an operator's finger, which is used when a user operates the digital camera 1. Note that a memory card or a hard disk, for example, is used as the storage medium 7.

The display section 2 is formed by a liquid crystal display which is capable of providing naked-eye stereoscopic vision. The display section 2 employs a parallactic division method for dividing an image between left-eye and right-eye lines of sight for reproduction of a parallax, such as a parallax barrier method or a lenticular method. Further, the display section 2 may employ a DFD (depth focus 3D) method.

Figure 2B:
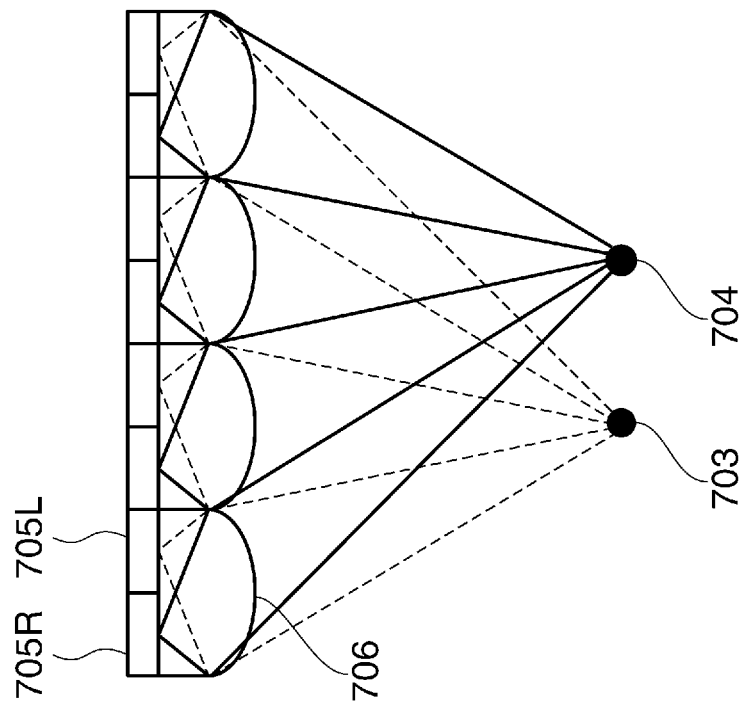
Figure 2A:
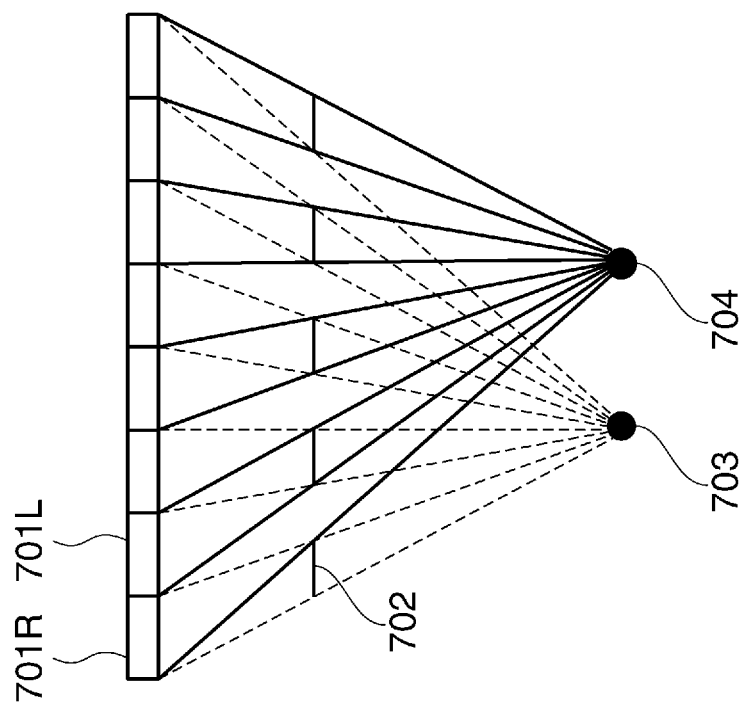

FIGS. 2A and 2B are views useful in explaining naked-eye stereoscopic vision on the display section 2 illustrated in FIG. 1, in which FIG. 2A illustrates the parallax barrier method, and FIG. 2B illustrates the lenticular method.

In the parallax barrier method illustrated in FIG. 2A, left-eye pixel areas 701L for the left eye and right-eye pixel areas 701R for the right eye are alternately arranged in the horizontal direction of a pixel array formed by TFT liquid crystal. Parallax barriers 702, which are formed by vertical slits, are arranged in the front of the pixel array. The parallax barriers 702 allow light from the left-eye pixel areas 701L to reach only the left eye 703, and light from the right-eye pixel areas 701R to reach only the right eye 704.

Note that the parallax barriers 702 may be formed by electronically-controllable switch liquid crystal. Further, the parallax barriers 702 may be arranged rearward of the pixel array and in front of a light source.

In the lenticular method illustrated in FIG. 2B, left-eye pixel areas 705L for the left eye and right-eye pixel areas 705R for the right eye are alternately arranged in the horizontal direction of the screen. Semi-cylindrically-shaped lenticular lenses 706 allow light from the left-eye pixel areas 705L to reach only the left eye 703, and light from the right-eye pixel areas 705R to reach only the right eye 704.

As described above, in the parallactic division method, it is possible to project images different from each other on the left and right human eyes, respectively, to thereby add a depth feeling to a resultant image.

On the other hand, in the DFD method, two TFT liquid crystal panels are arranged such that they are spaced from each other in a front-rear direction with a predetermined gap. An image is displayed on each of the two TFT liquid crystal panels with a degree of brightness dependent on the distance of an object of the image from the digital camera 1. In the present example, as the object is positioned nearer to the digital camera 1, the luminance of the image thereof displayed on the front-side TFT liquid crystal panel is made higher. This makes it possible to produce a continuous depth feeling between the images displayed on the front-side and back-side TFT liquid crystal panels.

Figure 3:
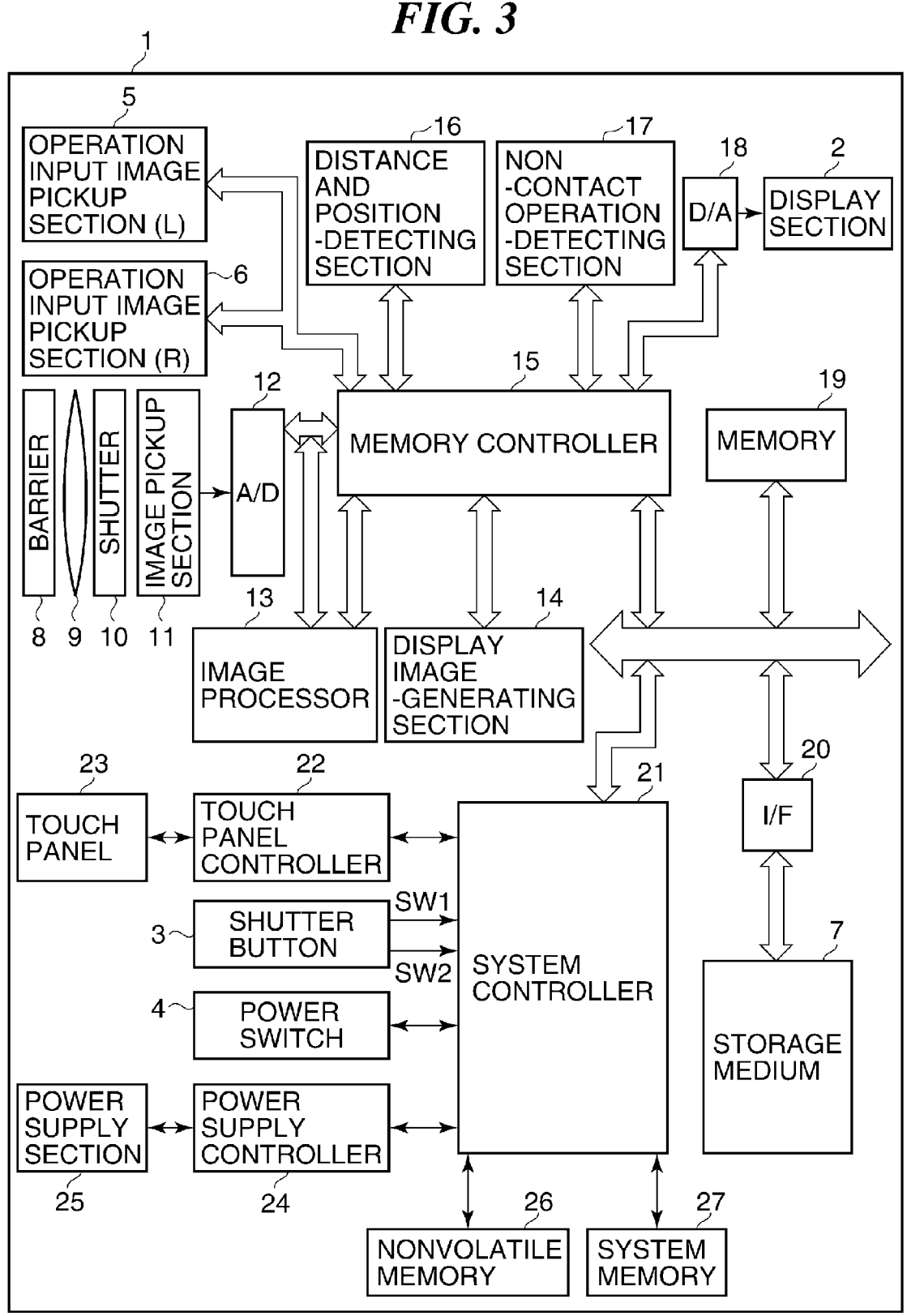
FIG. 3 is a block diagram of the digital camera shown in FIG. 1.

FIG. 3 is a block diagram of the digital camera 1 illustrated in FIG. 1.

Referring to FIG. 3, the illustrated digital camera 1 has a photographic lens 9. This photographic lens 9 includes a focus lens. A shutter 10 with an aperture function is disposed downstream of the photographic lens 9. An optical image (object image) having passed through the shutter 10 is formed on an image pickup section 11. The image pickup section 11 comprises a CCD (charged coupled device) or a CMOS (complementary metal oxide semiconductor), and converts the optical image to an electric signal (analog signal). The analog signal output from the image pickup section 11, is converted to a digital signal (image signal) by an analog-to-digital converter 12.

Note that an image pickup system including the photographic lens 9, the shutter 10, and the image pickup section 11 is covered by a barrier 8, whereby the image pickup system is prevented from being soiled or damaged.

An image processor 13 processes the image signal output from the analog-to-digital converter 12 or image data given by a memory controller 15, for predetermined pixel interpolation, resizing, such as size reduction, and color conversion. Further, the image processor 13 performs predetermined computation processing using the image data, and a system controller 21 performs exposure control and ranging control based on the results of the computation. Through these controls, AF (auto-focus) processing, AE (automatic exposure) processing, and EF (electronic flash pre-emission) processing, based on a TTL (through the lens)-method, are executed. The image processor 13 further performs predetermined computation processing using image data, and also performs TTL method-based AWB (automatic white balance) based on results of the computation.

The image signal output from the analog-to-digital converter 12 is written into a memory 19 via the image processor 13 and the memory controller 15 or directly via the memory controller 15, as image data. The memory 19 has sufficient storage capacity to store a predetermined number of still images, a predetermined playback time length of moving images, and audio data. In the illustrated example, the memory 19 also plays the role of a memory (video memory) for image display.

A digital-to-analog converter 18 converts image data stored in the memory 19 to an analog signal and delivers the analog signal to the display section 2. This causes image data written into the memory 19 to be displayed on the display section 2 as an image.

A nonvolatile memory 26 is capable of performing electrical deletion and recording, and is implemented by an EEPROM, for example. The nonvolatile memory 26 stores constants, programs, etc., for use in operation of the system controller 21. Note that examples of the programs include a program provided for executing an operation-responsive display process, described hereinafter with reference to FIG. 5.

The system controller 21 controls the overall operation of the digital camera 1. The system controller 21 executes the programs stored in the nonvolatile memory 26 to thereby perform various processes described hereinafter. A system memory 27 is e.g. a RAM. The constants and variables for use in operation of the system controller 21, the programs read from the nonvolatile memory 26, and so forth are loaded in the system memory 27. Further, the system controller 21 controls the memory 19, the digital-to-analog converter 18, the display section 2, and so forth to thereby execute a screen display process.

The shutter button 3 includes first and second shutter switches, and is operated for inputting operation instructions to the system controller 21. The first shutter switch is turned on by half operation, i.e. so-called "half press", of the shutter button 3 (shooting preparation instruction), to deliver a first shutter switch signal SW1. In response to the first shutter switch signal SW1, the AF processing, the AE processing, the AWB processing, and the EF processing are started.

The second shutter switch is turned on by complete operation, i.e. so-called "full press", of the shutter button 3 (shooting instruction), to deliver a second shutter switch signal SW2. In response to the second shutter switch signal SW2, the system controller 21 starts a sequence of shooting processing from reading of a signal from the image pickup section 11 to writing of image data in the storage medium 7.

A power supply controller 24 includes a battery detection circuit, a DC-DC converter, a switch circuit, and so forth. Further, the power supply controller 24 detects whether a battery is mounted, a type of the battery, and a remaining charge of the battery. The power supply controller 24 controls the DC-DC converter based on detection results and instructions from the system controller 21 to supply a necessary voltage to each of the components including the storage medium 7 over a required time period.

A power supply section 25 includes a primary battery, such as an alkaline battery or a lithium battery, a secondary battery, such as a NiCd (nickel-cadmium) battery, a NiMH (nickel-metal hydride) battery, or an Li battery, and an AC adapter, for example. An interface 20 provides interface between the storage medium 7, such as a memory card or a hard disk, and the digital camera 1. The storage medium 7 is e.g. a memory card, and is implemented e.g. by a semiconductor memory or a magnetic disk.

The illustrated digital camera 1 has a touch panel 23. A touch panel controller 22 detects a touch on the display section 2 by the touch panel 23. In the illustrated example, the touch panel controller 22 is capable of detecting an operation on the touch panel 23. For example, the touch panel controller 22 detects a touch-down, a touch-on, a move, a touch-up, and a touch-off.

Here, the term "touch-down" is intended to mean an operation of touching the touch panel 23 by a finger or a pen. The term "touch-on" is intended to mean a state of the touch panel 23 having been touched by the finger or the pen. The term "move" is intended to mean an operation of moving the finger or the pen on the touch panel 23 while being kept in contact with the touch panel 23. The term "touch-up" is intended to mean an operation of moving the finger or the pen off the touch panel 23. The term "touch-off" is intended to mean a state where the finger or the pen is not in contact with the touch panel 23.

The touch panel controller 22 notifies the system controller 21 of one of the above-described operations and position coordinates indicative of a position of the finger or the pen on the touch panel 23. Then, the system controller 21 determines, based on the notified information, what operation has been performed on the touch panel. During a move, the system controller 21 determines the direction of motion of the finger or pen which is moving on the touch panel 23, for each of vertical and horizontal components of motion on the touch panel 23, based on changes of the position coordinates.

In the present embodiment, when the touch panel 23 is touched down and then touched up after a certain move, this operation is referred to as "drawing a stroke". Further, an operation of drawing a stroke quickly will be referred to as a "flick". The flick is an operation of quickly moving a finger or a pen for a certain distance while keeping the finger or the pen in contact with the touch panel 23 and then moving the finger or the pen off the same. In other words, the flick is an operation of quickly moving a finger or a pen on the touch panel 23 as if flicking the finger or the pen against the touch panel 23. When detecting that a move of a predetermined distance or more has been performed at a predetermined speed or higher and detecting a touch-up in the state, the system controller 21 determines that a flick has been performed. Further, it is assumed that when detecting that a move of a predetermined distance or more has been performed at a speed lower than the predetermined speed, the system controller 21 determines that a drag has been performed.

As described hereinabove with reference to FIG. 1, the operation input image pickup sections (L) 5 and (R) 6 are for picking up an operation element, such as an operator's finger. Operation element image data obtained as the result of picking up by the operation input image pickup sections (L) 5 and (R) 6 is directly written into the memory 19 via the image processor 13 and the memory controller 15, or directly via the memory controller 15.

A distance and position-detecting section 16 detects the operator's finger, which is an operation element, from the operation element image data. Then, the distance and position-detecting section 16 detects the distance from the display section 2 to the finger and the position of the finger with respect to a display area of the display section 2, and notifies the system controller 21 of the results of the detection. As will be described hereinafter, the system controller 21 causes the display section 2 to change the display form on the display section 2 according to the distance from the display section 2 to the operation element and the position of the finger with respect to the display area of the display section 2.

A non-contact operation-detecting section 17 computes an amount of change in the position of the operation element (position of the operator's finger) at predetermined intervals, based on a plurality of continuously acquired operation element image data items. Based on the computation, the non-contact operation-detecting section 17 detects the motion of the operation element, and notifies the system controller 21 of the detection results. As will be described hereinafter, the system controller 21 recognizes an instruction for operating the digital camera 1 according to a trajectory of the motion of the finger in a state where the operator's finger (operation element) is not in contact with the display section 2. Then, the system controller 21 controls the digital camera 1 based on the recognized operation instruction. A display image-generating section 14 generates display data (stereoscopic-vision image data) to be displayed on the display section 2.

Figure 4:
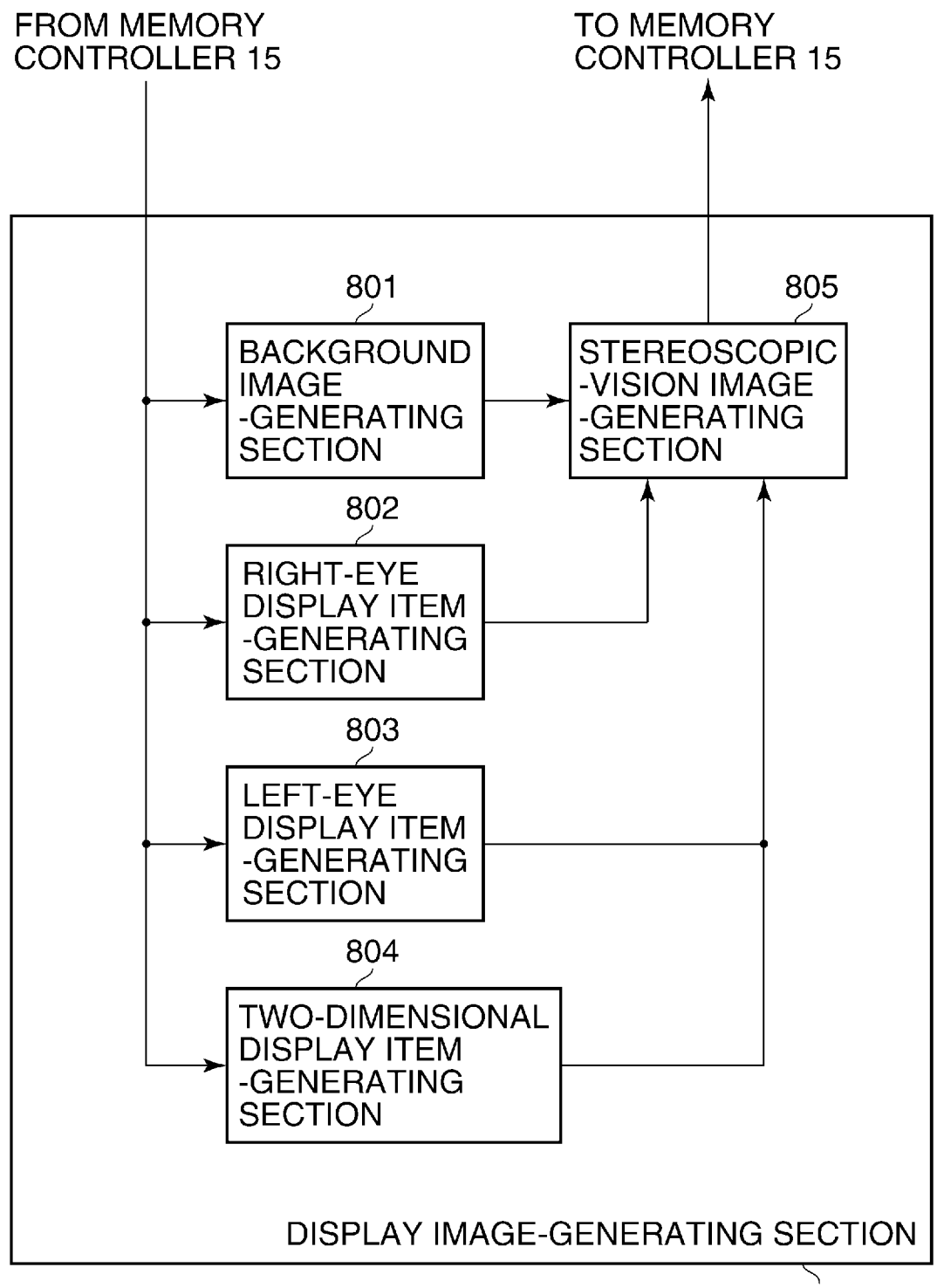
FIG. 4 is a block diagram of a display image-generating section appearing in FIG. 3.

FIG. 4 is a block diagram of the display image-generating section 14 appearing in FIG. 3.

In the illustrated example, the display image-generating section 14 employs the parallactic division method, to display a display image stereoscopically according to display data on the display section 2. The display image-generating section 14 comprises a background image-generating section 801, a right-eye display item-generating section 802, a left-eye display item-generating section 803, a two-dimensional display item-generating section 804, and a stereoscopic-vision image-generating section 805.

The background image-generating section 801 reads image data from the memory 19 via the memory controller 15, and generates background image display data. Then, the background image-generating section 801 outputs the background image display data to the stereoscopic-vision image-generating section 805.

The right-eye display item-generating section 802 reads out right-eye bitmap data of a stereoscopic-vision-compatible display item from the memory 19 via the memory controller 15 to thereby generate right-eye display data, and outputs the generated right-eye display data to the stereoscopic-vision image-generating section 805.

The left-eye display item-generating section 803 reads out left-eye bitmap data of the stereoscopic-vision-compatible display item from the memory 19 via the memory controller 15 to thereby generate left-eye display data, and outputs the generated left-eye display data to the stereoscopic-vision image-generating section 805.

Here, the term "stereoscopic-vision-compatible display item" (operation item) is intended to mean a display image which is formed such that a depth feeling is provided when the stereoscopic-vision-compatible display item is displayed on a liquid crystal display capable of providing naked-eye stereoscopic vision. For example, the stereoscopic-vision-compatible display item is e.g. a switch, a button, a dial or an icon for use in operation, which is virtually represented on a space a predetermined distance away from the display area of the display section 2. In the present embodiment, the digital camera 1 enables the operator to operate the stereoscopic-vision-compatible display item using a finger so as to input an operation instruction.

The two-dimensional display item-generating section 804 generates two-dimensional display item display data by reading out bitmap data for the two-dimensional display item from the memory 19 via the memory controller 15. The two-dimensional display item-generating section 804 outputs the generated two-dimensional display item display data to the stereoscopic-vision image-generating section 805.

In the present embodiment, the term "two-dimensional display item" is intended to mean a display image which is formed such that a depth feeling is not provided when the two-dimensional display item is displayed on a liquid crystal display capable of providing naked-eye stereoscopic vision. Note that as the two-dimensional display item, there may be used a display image formed to provide a depth feeling which is reduced, compared with the depth feeling of the stereoscopic-vision-compatible display item, to such a level that it is barely identified as the two-dimensional display item. In the present embodiment, when the operator performs a flick operation or a touch-down operation on the two-dimensional display item displayed on the display section 2, it is possible to input an operation instruction from the operator.

The stereoscopic-vision image-generating section 805 generates stereoscopic-vision image data based on the background image display data, the right-eye display data, the left-eye display data, and the two-dimensional display item display data, and writes the stereoscopic-vision image data into the memory 19 via the memory controller 15.

For example, first, the stereoscopic-vision image-generating section 805 generates right-eye stereoscopic-vision image data by superimposing the right-eye display data and the two-dimensional display item display data on the background image display data. Then, the stereoscopic-vision image-generating section 805 generates left-eye stereoscopic-vision image data by superimposing the left-eye display data and the two-dimensional display item display data on the background image display data.

The stereoscopic-vision image-generating section 805 obtains narrow rectangular areas for right eye and narrow rectangular areas for left eye by dividing the right-eye stereoscopic-vision image data and the left-eye stereoscopic-vision image data, respectively, into a plurality of narrow rectangular areas extending in the vertical direction of the screen. Then, the stereoscopic-vision image-generating section 805 generates stereoscopic-vision image data by alternately arranging the narrow rectangular areas for right eye and the narrow rectangular areas for left eye in the horizontal direction of the screen. At this time, the right-eye stereoscopic-vision image data and the left-eye stereoscopic-vision image data are generated as the same image data as the original image data read from the memory 19 except that they are divided. In short, when each of the right-eye stereoscopic-vision image data and the left-eye stereoscopic-vision image data is displayed, it is viewed as a two-dimensional image without a depth, by the operator.

Further, the right-eye stereoscopic-vision image data and the left-eye stereoscopic-vision image data are generated in association with the same two-dimensional display item. More specifically, when the two-dimensional display item is displayed, it is viewed as a two-dimensional display item without a depth by the operator. On the other hand, the right-eye stereoscopic-vision image data and the left-eye stereoscopic-vision image data have a parallax differently from the stereoscopic-vision-compatible display item, and hence the stereoscopic-vision-compatible display item is viewed as a stereoscopic or three-dimensional image by the operator.

The illustrated digital camera 1 can control whether or not to display the image data, the two-dimensional display item, and the stereoscopic-vision-compatible display item, independently of each other.

Figure 5:
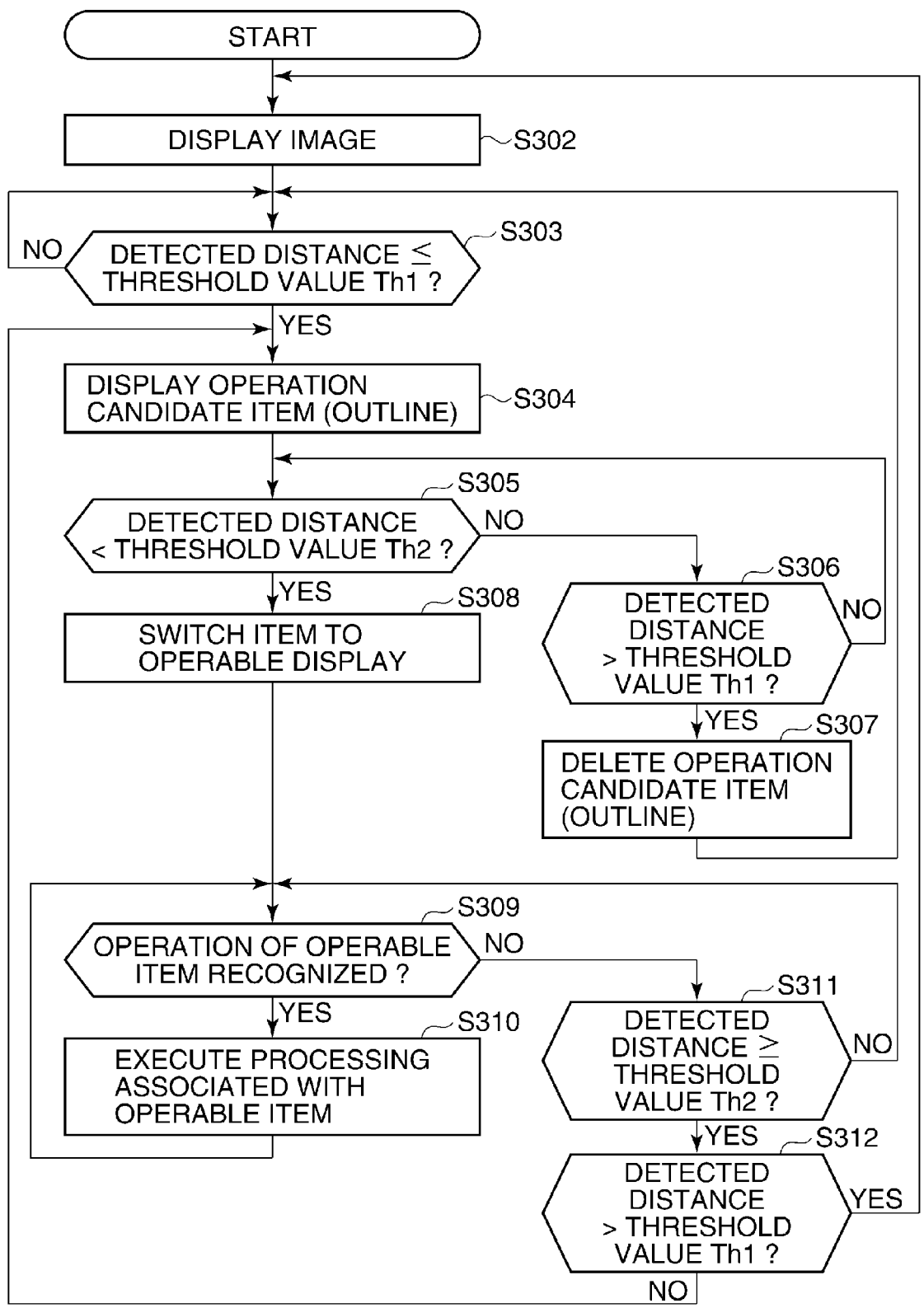
FIG. 5 is a flowchart of an operation-responsive display process performed by the digital camera shown in FIG. 3.

FIG. 5 is a flowchart of an operation-responsive display process performed by the digital camera 1 shown in FIG. 3. Note that the system controller 21 executes a program stored in the nonvolatile memory 26 whereby the operation-responsive display process is performed.

Referring to FIGS. 3 and 5, now, when the operator operates the power switch 4 appearing in FIG. 1 to turn on the power, the system controller 21 reads out image data stored in the storage medium 7, and displays an image on the display section 2 based on the image data (step S302).

Figure 6A:
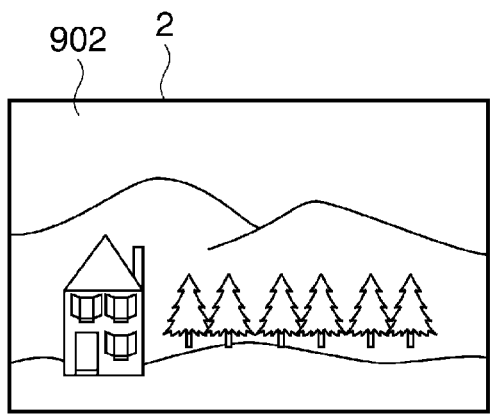
Figure 6B:
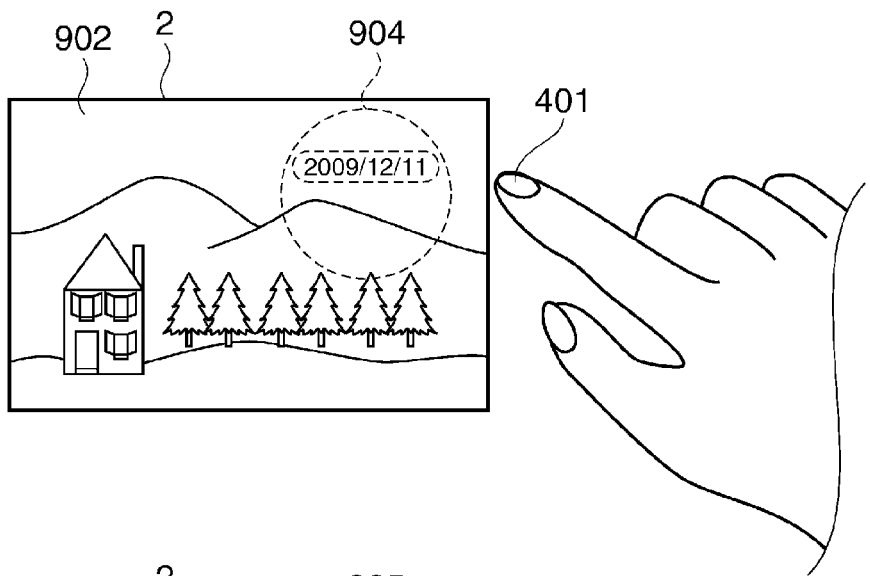
Figure 6C:
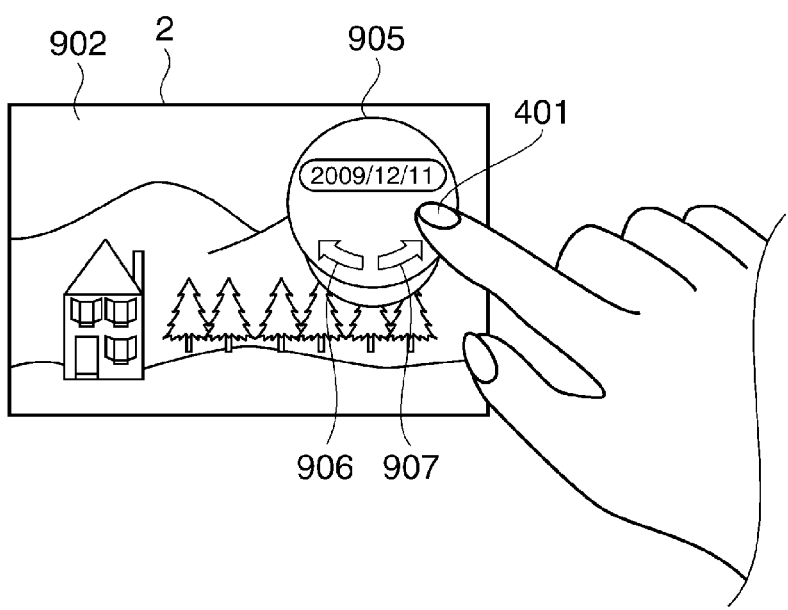

FIGS. 6A to 6C are views useful in explaining examples of images displayed on the display section 2 appearing in FIG. 3, in which FIG. 6A shows a display image 902 displayed on the display section 2, FIG. 6B shows a state in which an operation candidate item 904 is displayed in a manner superimposed on the display image 902, and FIG. 6C shows a state in which an operable display has been performed on the display section 2.

In the step S302, for example, the display image 902 illustrated in FIG. 6A is displayed in the display area of the display section 2. Then, the distance and position-detecting section 16 detects a distance between a user's finger, which is an operation element and the display section 2, and a position of the finger, according to the operation element image data obtained as the result of picking-up by the operation input image pickup sections (L) 5 and (R) 6.

Figure 7:
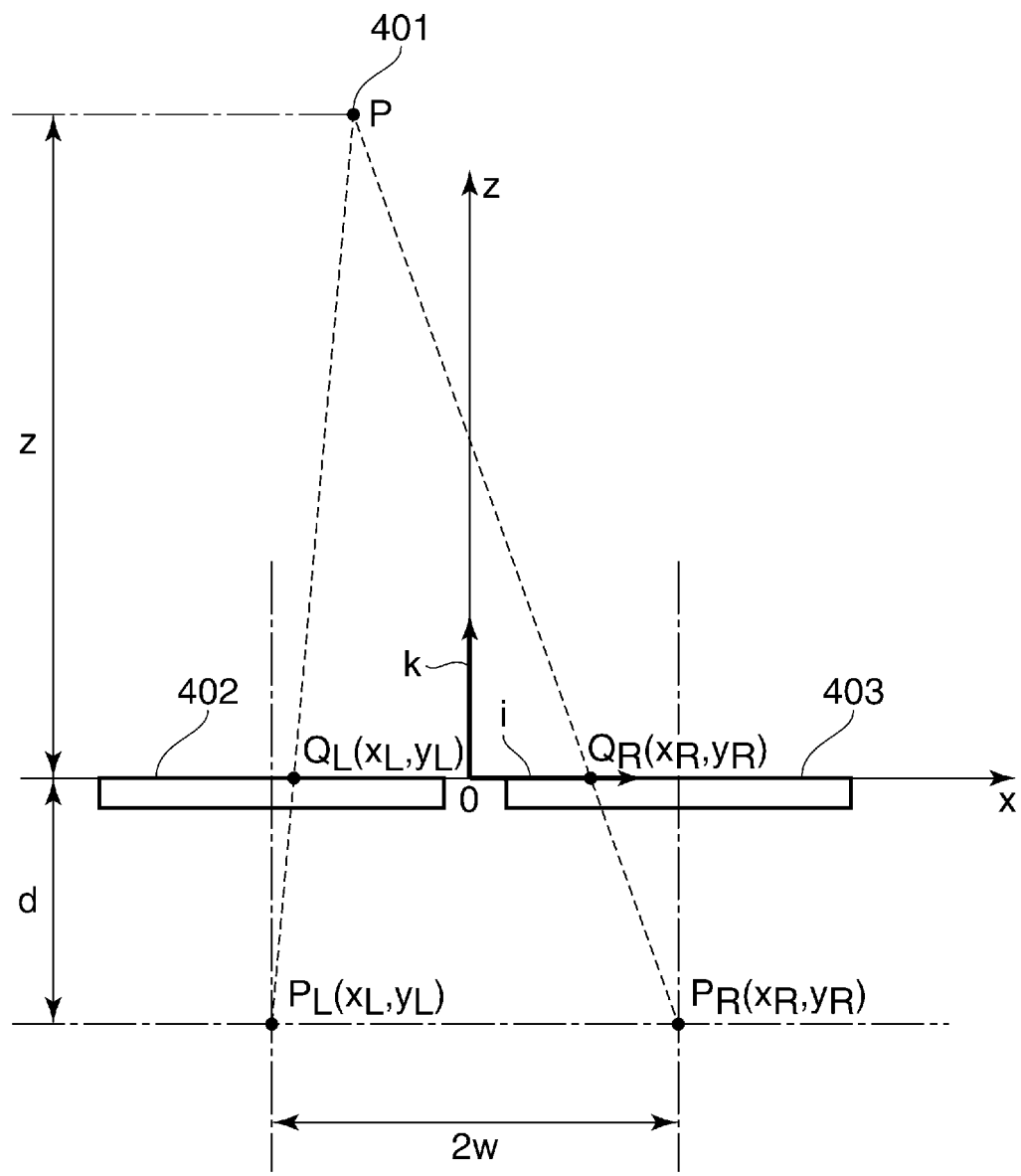
FIG. 7 is a view useful in explaining detection of a distance and a position, by a distance and position-detecting section appearing in FIG. 3.

FIG. 7 is a view useful in explaining detection of a distance and a position, by the distance and position-detecting section 16 appearing in FIG. 3.

In FIG. 7, it is assumed here that the center positions (virtual viewpoint positions) of the operation input image pickup sections (L) 5 and (R) 6 are represented by $P_L$ and $P_R$, respectively, the center positions $P_L$ and $P_R$ are on an x-z plane, and further an imaging surface (L) 402 of the operation input image pickup section (L) 5 and an imaging surface (R) 403 of the operation input image pickup section (R) 6 are on an x-y plane perpendicular to the x-z plane.

Now, the position of an operation element 401 is represented by P. An intersection (three-dimensional coordinates) of a straight line connecting the position P and the viewpoint position $P_L$ with the imaging surface (L) 402 is represented by $Q_L$, and an intersection (three-dimensional coordinates) of a straight line connecting the position P and the viewpoint position $P_R$ with the imaging surface (R) 403 is represented by $Q_R$. Further, two-dimensional coordinates of the intersection $Q_L$ on the imaging surface (L) 402 are represented by $Q_L$ ($X_L$, $Y_L$), and two-dimensional coordinates of the intersection $Q_R$ on the imaging surface (R) 403 are represented by $Q_R$ ($X_R$, $Y_R$). Further, the distance between the viewpoint positions $P_L$ and $P_R$ is represented by 2w, and the distance from the viewpoint positions $P_L$ and $P_R$ to the imaging surfaces (L) 402 and (R) 403 are represented by d.

Assuming that a unit vector in the X-axis direction is represented by i, a unit vector in the Y-axis direction is represented by j, and a unit vector in the Z-axis direction is represented by k, there hold the following equations (1) to (4):

$$P_L = -wi - dk \quad (1)$$

$$P_R = wi - dk \quad (2)$$

$$Q_L = (x_L - w)i + y_L j \quad (3)$$

$$Q_R = (x_R - w)i + y_R j \quad (4)$$

Since a straight line connecting between the viewpoint position $P_L$ and the intersection $Q_L$ and a straight line connecting between the viewpoint position $P_R$ and the intersection $Q_R$ intersects with each other at the position P, there holds the following equation (5):

$$P = P_L + m(Q_L - P_L) = P_R + n(Q_R - P_R) \quad (5)$$

When the equation (5) is solved with respect to unknown numbers m and n, there is obtained the following equation (6):

$$m = n = 2w/(x_L - x_R) \quad (6)$$

This makes it possible to obtain the position P of the operation element 401 by the following equation (7):

$$P = (mx_L - w)i + my_L j + (m-1)dk \quad (7)$$

The system controller 21 obtains operation element distance information indicative of the distance between the operation element 401 and the display section 2 according to position information indicating the position P of the operation element 401 detected by the distance and position-detecting section 16.

FIG. 8 is a perspective view of the distance between the display section 2 appearing in FIG. 1 and the operation element 401.

As shown in FIG. 8, the distance between the display area of the display section 2 and the operation element 401 (hereinafter referred to as the "detected distance") is determined with reference to threshold values Th1 and Th2. The threshold values Th1 and Th2 are set in advance in the system controller 21. The threshold value Th1 is larger than the value Th2. The system controller 21 determines a state in which the detected distance is not larger than the threshold value Th1 and is larger the threshold value Th2 as a first close state, and a state in which the detected distance is not larger than the threshold value Th2 as a second close state.

First, the system controller 21 determines whether or not the detected distance is not larger than the threshold value Th1. More specifically, the system controller 21 determines whether or not the operation element (finger) 401 has approached the display area (screen) to such a point that the detected distance is not larger than the threshold value Th1

(step S303). If the operation element 401 has not approached the screen to such a point that the detected distance is not larger than the threshold value Th1 (NO to the step S303), the system controller 21 remains on standby.

If the operation element 401 has approached the screen to such a point that the detected distance is not larger than the threshold value Th1 (YES to the step S303), that is, the operation element 401 and the screen are in the first close state, the system controller 21 switches the display being displayed on the display section 2. For example, in the first close state, the system controller 21 displays a display screen illustrated in FIG. 6B on the display section 2 (step S304). An operation candidate item 904 is displayed on this display screen in a manner superimposed on a displayed image 902. Although the operation candidate item 904 represents which operation can be performed in the current operation mode, the user cannot perform an operation input using the operation candidate item 904.

Then, the system controller 21 determines whether or not the operation element (finger) 401 has approached the screen to such a point that the detected distance is smaller than the threshold value Th2 (step S305). If the operation element 401 has not approached the screen to such a point that the detected distance is smaller than the threshold value Th2 (NO to the step S305), the system controller 21 determines whether or not the operation element 401 is more than the threshold value Th1 away from the screen (step S306). If the operation element 401 is not more than the threshold value Th1 away from the screen (NO to the step S306), the system controller 21 returns to the step S305, for determining again whether or not the operation element 401 has approached the screen to such a point that the detected distance is smaller than the threshold value Th2.

On the other hand, if the operation element 401 is more than the threshold value Th1 away from the screen (YES to the step S306), the system controller 21 determines that the operation element 401 and the screen are not close to each other, and deletes the operation candidate item 904 from the display screen (step S307). That is, the system controller 21 switches the display screen from an item displayed state illustrated in FIG. 6B to an image reproduced state illustrated in FIG. 6A. Then, the system controller 21 returns to the step S303 to determine again whether or not the operation element 401 has approached the screen to such a point that the detected distance is not larger than the threshold value Th1.

If the operation element 401 has approached the screen to such a point that the detected distance is smaller than the threshold value Th2 (YES to the step S305), the system controller 21 determines that the operation element 401 and the screen has been placed in the second close state, and switches the operation candidate item 904 to an operable item 905 in an operable display state in which it can be operated, as illustrated in FIG. 6C (step S308).

The system controller 21 displays the operable item 905 three-dimensionally on the display screen to make the user aware that the operable item 905 can be operated. In short, the system controller 21 displays the operable item 905 in a highlighted manner, and permits the user to perform an input operation on the operable item 905.

In doing this, as illustrated in FIG. 6C, the system controller 21 displays operations that can be performed using the operable item 905, by arrows 906 and 907. As described above, the non-contact operation-detecting section 17 detects whether or not the operable item 905 has been operated, and what operations have been performed using the operable item 905. The system controller 21 recognizes an operation instruction according to a trajectory of the motion of the operation element 401 detected by the non-contact operation-detecting section 17 (results of detection of the motion of the operation element), whereby the system controller 21 determines whether or not the operable item 905 has been operated by the operation element 401 (step S309).

Here, a description will be given of a method of detecting the motion of the operation element 401 according to the plurality of operation element image data items successively acquired.

FIGS. 9A to 9E are views useful in explaining detections of the motions of the operation element 401 by the non-contact operation-detecting section 17 appearing in FIG. 3, in which FIG. 9A shows a trajectory of the operation element 401 over a predetermined time period, and FIGS. 9B to 9E show examples of trajectory data for operation instructions (operation instruction trajectory data).

Referring to FIGS. 9A to 9E, the non-contact operation-detecting section 17 acquires change vector data V(t) indicative of an amount of change in the operation element 401 at predetermined intervals based on position information detected by the distance and position-detecting section 16. The non-contact operation-detecting section 17 acquires trajectory data of the operation element 401 (operation element trajectory data) by deriving the trajectory of the operation element 401 by combining change vectors V(t), V(t+1), V(t+2), . . . , at the predetermined intervals. Then, the non-contact operation-detecting section 17 delivers the operation element trajectory data to the system controller 21.

On the other hand, a plurality of the operation instruction trajectory data items are stored in advance in the system memory 27. The operation instruction trajectory data items are e.g. vector data items 601 to 604 shown in FIGS. 9B to 9E. Each of the operation instruction trajectory data items 601 and 604 is counterclockwise vector data, while each of the operation instruction trajectory data items 602 and 603 is clockwise vector data.

When displaying the operable item 905 (FIG. 6C) on the display section 2, the system controller 21 displays the arrows 906 and 907, as mentioned above, according to associated ones of the operation instruction trajectory data items.

The system controller 21 compares the operation element trajectory data with each of the operation instruction trajectory data items 601, 602, 603, and 604. In the FIG. 6C case, the arrows 906 and 907 (operation instructions) associated with the operation instruction trajectory data items 603 and 601, respectively, are displayed on the operable item 905 of the display section 2, and hence the system controller 21 compares the operation element trajectory data with each of the operation instruction trajectory data items 601 and 603. When it is regarded that the operation element trajectory data substantially corresponds to either of the operation instruction trajectory data items 601 and 603, the system controller 21 determines that the operable item 905 has been operated.

If it is determined that the operable item 905 has been operated (YES to the step S309), the system controller 21 executes predetermined processing associated with the operable item 905 (step S310). In the example illustrated in FIG. 6C, if the user operates the operable item 905 in the direction of the arrow 906 or 907, the system controller 21 performs image scrolling of a set date.

After performing the predetermined processing (image scrolling, in the illustrated example), the system controller 21 returns to the step S309 to determine again whether or not the operable item 905 has been operated.

If the operable item 905 has not been operated (NO to the step S309), the system controller 21 determines whether or not the operation element 401 is the threshold value Th2 or more away from the screen (step S311). If it is determined that the operation element 401 is not the threshold value Th2 or more away from the screen (NO to the step S311), the system controller 21 recognizes that the user desires to operate the operable item 905 again, and returns to the step S309.

If it is determined that the operation element 401 is the threshold value Th2 or more away from the screen (YES to the step S311), the system controller 21 determines whether or not the operation element 401 is more than the threshold value Th1 away from the screen (step S312). If it is determined that the operation element 401 is not more than the threshold value Th1 away from the screen (NO to the step S312), the system controller 21 returns to the step S304, for canceling the display of the operable item 905 to display the operation candidate item 904.

On the other hand, if it is determined that the operation element 401 is more than the threshold value Th1 away from the screen (YES to the step S312), the system controller 21 returns to the step S302, for canceling the display of the operation candidate item 904 to display only the displayed image 902 (FIG. 6A) on the screen.

As described above, in the first embodiment, it is determined whether or not to display an item, which is to be displayed on the screen, according to the distance between the operation element 401 and the screen, so that the user is not hindered from viewing a displayed image. Further, when the operation element 401 has approached the screen, in other words, when the user desires to perform an operation input, an operable item is displayed on the screen, and therefore the user can perform the operation input after viewing an image for confirmation.

Furthermore, in the first embodiment, the screen display is switched stepwise according to the distance between the operation element 401 and the screen, and hence the user can intuitively switch operations and perform an operation input without operating an operating section provided for the digital camera.

Although in the first embodiment, it is determined whether or not the operation element 401 and the display section 2 (screen) are in a close state according to the distance between the operation element 401 and the display section 2 (screen), the determination may be carried out by detecting a change in the size of a picked-up image of the operation element 401.

Further, when it is determined that the operation element 401 and the screen are in the first close state, the system controller 21 may determine the distance between the operation element 401 and the threshold value Th2 and thereby change the display form of the operation candidate item 904. For example, as the operation element 401 approaches such that the detected distance becomes smaller from the threshold value Th1 to the threshold value Th2, the system controller 21 may display the operation candidate item 904 such that the size thereof is gradually increased. Furthermore, the system controller 21 may display the operation candidate item 904 such that it gradually becomes three-dimensional. Further, the system controller 21 may change the color of the operation candidate item 904 from a light color to a dark color.

By changing the display form of the operation candidate item 904, as described hereinabove, the user can be easily and visually aware which operation candidate item the operation element 401 is approaching.

Although in FIG. 6C, the operable item 905 is displayed three-dimensionally, the operable item 905 and the operation candidate item 904 may be changed in color or size insofar as the display of the operable item 905 can be distinguished from the display of the operation candidate item 904. This enables the user to easily and visually confirm an operable state even if it is impossible to three-dimensionally display the operable item 905.

Further, in the description with reference to FIG. 6C, the system controller 21 determines an operation input not by a touching operation on the touch panel but by a non-contact operation of the operable item 905 (a so-called gesture input). However, e.g. when the operable item 905 is not three-dimensionally displayed, the system controller 21 may determine an operation input by an operation on the touch panel 23, such as the touch-down, the touch-on, or the move. In doing this, the system controller 21 may disable operation inputs on display items other than the operable item 905 so as to prevent an erroneous operation.

Next, a description will be given of a digital camera, which is an image pickup apparatus to which is applied an image processing apparatus according to a second embodiment of the present invention. The digital camera according to the second embodiment has the same hardware configuration as the digital camera described with reference to FIGS. 1 and 3.

In the digital camera 1 according to the second embodiment, operation inputs are switched according to the shape of an operation element. More specifically, details of operation inputs (operation details) are switched according to the shape of the operation element having approached the display section.

Figure 10A:
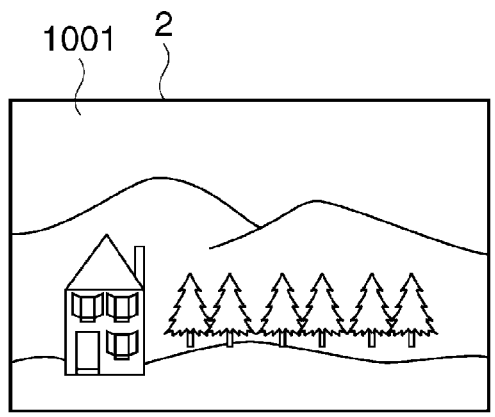
Figure 10B:
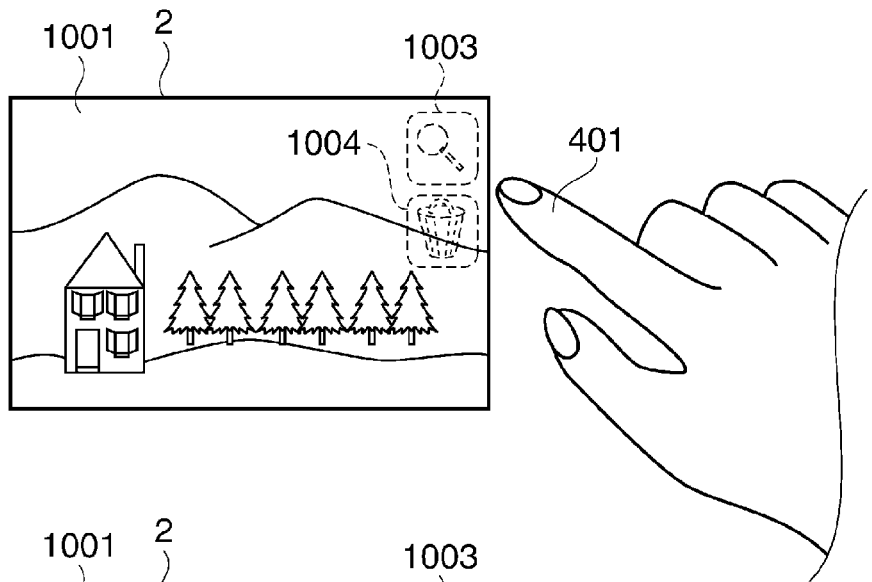
Figure 10C:
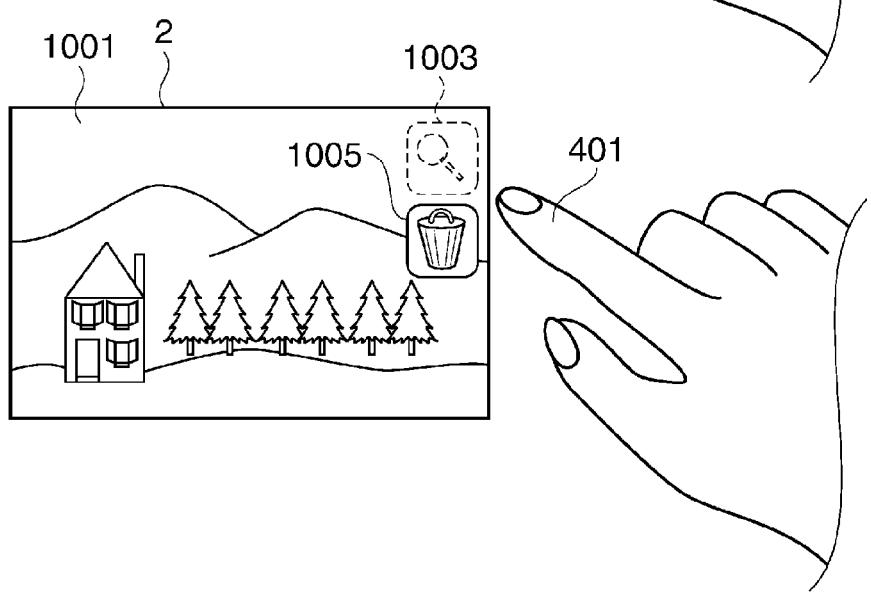

FIGS. 10A to 10C are views useful in explaining a display process for displaying an image on the display section 2 of the digital camera according to the second embodiment, in which FIG. 10A shows a state in which the image is displayed on the display section 2, FIG. 10B shows a state in which the operation element 401 is approaching the screen of the display section 2, and FIG. 10C shows a state in which the operation element 401 has approached the screen.

Referring to FIGS. 10A to 10C, in the display process, under the control of the system controller 21, image data stored in the storage medium 7 is displayed as an image on the display section 2 according to an instruction of the operator. In the display state illustrated in FIG. 10A, it is assumed that the user has caused an image 1001 to be displayed on the display section 2 by the display process to check the displayed image 1001. Further, it is assumed that as the result of the checking, the user causes the operation element 401 to approach the screen so as to perform an operation input.

When the user makes a finger (operation element) 401 closer to the screen for an operation input, thereby placing the operation element 401 and the screen in the first close state, as described in the first embodiment, the system controller 21 switches the display on the screen. FIG. 10B shows a screen displayed in the first close state. Here, operation candidate items 1003 and 1004 are displayed on the screen in a manner superimposed on the displayed image 1001.

In the illustrated example, to superimpose the operation candidate items 1003 and 1004 on the displayed image 1001, only the outlines of the operation candidate items 1003 and 1004 are displayed by dotted lines (in a display form which does not hinder visual recognition). This prevents the user from being hindered in visual recognition of the displayed image 1001. Note that in FIG. 10B, the operation candidate item 1003 represents an image enlarging button, and the operation candidate item 1004 represents an image deletion button.

By the way, as described in the operation-responsive display process shown in FIG. 5, if in the step S303, the operation element 401 has approached the display section 2 (screen) to such a point that the detected distance is not larger than the threshold value Th1, the system controller 21 displays the operation candidate items 1003 and 1004 in the step S304. In doing this, the system controller 21 determines the shape of the operation element 401 based on the operation element image data (i.e. identifies the shape of the operation element 401 to obtain an identification result). Further, the system controller 21 predicts what operation the user is about to perform, according to the shape of the operation element 401 (identification result). Then, the system controller 21 switches the display of the operation candidate items 1003 and 1004, according to the result of the prediction.

In the example illustrated in FIG. 10B, the user is about to perform an operation by the operation element 401, i.e. by a forefinger, and the forefinger is in a straightened state. When the forefinger in the straightened state becomes closer to the screen, as described above, the system controller 21 predicts that the user is about to perform an operation input by selecting and touching one of the operation candidate items. Therefore, the system controller 21 displays the operation candidate items 1003 and 1004 each in the form of a selection button on the display section 2 in a manner superimposed on the displayed image 1001.

As described in the step S305 in FIG. 5, when the operation element 401 has approached the operation candidate item 1004 to such a point that the detected distance is smaller than the threshold value Th2, the system controller 21 switches the operation candidate item 1004 to an operable item 1005 and displays the same on the screen (see FIG. 10C). In doing this, to prevent an erroneous operation, the system controller 21 performs control to disable an operation input on the operation candidate item 1003 other than the operable item 1005.

Further, when the operation element 401 has approached a plurality of operation candidate items, the system controller 21 switches the closest one of the operation candidate items to an operable item, and deletes the operation candidate items other than the operable item. Note that the display form may be changed, for example, such that the operation candidate items other than the operable item are each displayed in a corner of the screen in a state reduced in size.

As described above, if unselected operation candidate items are made inconspicuous, it is possible to prevent the user from being confused when performing an operation input. Further, it is also possible to prevent unselected operation candidate items from obstructing the user from viewing an image.

The system controller 21 deletes the displayed image 1001 when it is determined that the operation element 401 has touched down the operable item 1005, by executing predetermined processing similarly to the step S309 of the operation-responsive display process described with reference to FIG. 5.

Figure 11A:
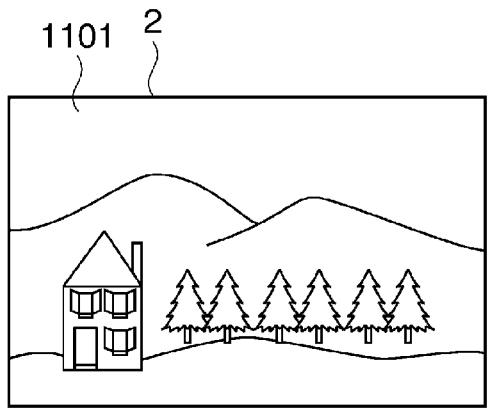
Figure 11B:
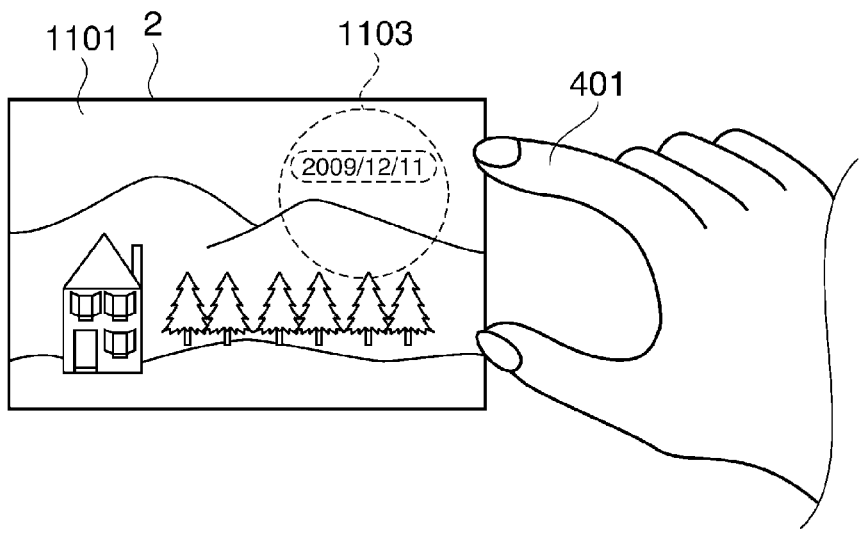
Figure 11C:
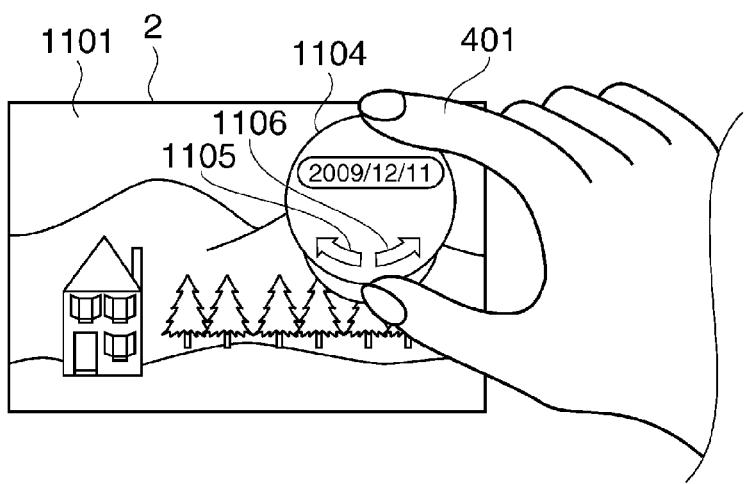

FIGS. 11A to 11C are views useful in explaining another example of the display process for displaying an image on the display section of the digital camera as the image pickup apparatus to which is applied the image processing apparatus according to the second embodiment, in which FIG. 11A shows a state in which the image is displayed on the display section, FIG. 11B shows a state in which the operation element is approaching the screen of the display section, and FIG. 11C shows a state in which the operation element has approached the screen.

In the display state illustrated in FIG. 11A, it is assumed that the user has caused an image 1101 to be displayed on the display section 2 by the display process to check the displayed image 1101. As described hereinabove, when the operation element 401 has approached the display section 2 (screen) to such a point the detected distance is not larger than the threshold value Th1 (within a first threshold distance), the system controller 21 displays operation candidate items 1103 and 1104. In doing this, the system controller 21 determines the shape of the operation element 401 based on the operation element image data.

In the example illustrated in FIG. 11B, the user uses a thumb and a forefinger as the operation element 401 in such a manner that an article is pinched thereby. That is, the operation element 401 has an article pinching shape. When the fingers as the operation element 401 having an article pinching shape, as described above, have approached the screen, the system controller 21 predicts that the user is about to rotate a dial-type display item. As a consequence, the system controller 21 displays a dial-like operation candidate item 1103 on the screen in a manner superimposed on the displayed image 1101. In doing this, the system controller 21 displays the outline of the operation candidate item 1103 using dotted lines such that the user is not hindered from viewing the displayed image 1101.

When the operation element 401 has approached the operation candidate item 1103 to such a point the detected distance is smaller than the threshold value Th2 (within a second threshold distance), the system controller 21 switches the operation candidate item 1103 to an operable item 1104 (see FIG. 11C). In the illustrated example, the system controller 21 displays operations which can be performed on the operable item 1104 with the operation element 401, by arrows 1105 and 1106.

As described in the steps S309 and S310 in FIG. 5, the system controller 21 determines the direction of the motion of the operation element 401 according to a trajectory of the motion of the operation element 401 detected by the non-contact operation-detecting section 17, to thereby perform image scrolling of a date set in response to the user's operation input.

Note that differently from the case described with reference to FIGS. 11A to 11C, when the user does not perform a touch panel operation, the system controller 21 may disable operation inputs performed via the touch panel so as to prevent an erroneous operation.

As described hereinabove, in the second embodiment, the user can perform operation inputs using display items without being hindered from viewing an image. Further, in the second embodiment, an operation candidate item is displayed according to the shape of an operation element, and hence if the user changes the shape of the operation element, it is possible to easily attain an operation input dependent on the shape. This makes it possible for the user to operate the digital camera very intuitively.

As is apparent from the above description, in FIG. 3, the distance and position-detecting section 16 (detection sensor) and the system controller 21 function as a distance detection unit. Further, the system controller 21 functions as a first display control unit and a second display control unit. Furthermore, the operation input image pickup sections 5 and 6 and the system controller 21 function as an identification unit. Note that the image processing apparatus comprises the image pickup section 11, the analog-to-digital converter 12, the image processor 13, and the system controller 21.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the functions of either of the above-described embodiments can be accomplished by causing the image processing apparatus to execute the functions as a control method. Further, the functions of either of the above-described embodiments may be accomplished by causing a computer incorporated in the image processing apparatus to execute a program implementing the functions, as a control program. Note that the control program is stored e.g. in a computer-readable storage medium.

In this case, the control method and the control program includes at least distance detection, first display control, and second display control.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

This application claims priority from Japanese Patent Application No. 2011-120341 filed May 30, 2011, which is hereby incorporated by reference herein in its entirety.

What is claimed is:

1. An image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, comprising: a distance detection unit configured to detect a distance between the screen and the operation element to obtain a detected distance; a display control unit configured to display an operation candidate item on the screen if the detected distance becomes not larger than a first predetermined threshold distance, and to change a display color of the operation candidate item depending on the detected distance such that the display color is darker if the detected distance is smaller, wherein said display control unit is configured to switch the operation candidate item to the operation item if the operation candidate item is touched down by the operation element, wherein the display control unit is configured to delete the display of the operation candidate item if the detected distance becomes larger than the first predetermined threshold distance; and wherein when the operation candidate item is displayed on the screen and the detected distance is not smaller than at least a second predetermined distance, which is smaller than the first predetermined threshold distance, the operation candidate item is not operable.

2. The image processing apparatus according to claim 1, wherein said display control unit displays the operation candidate item as an operable item if the detected distance is smaller than a second predetermined distance smaller than the first predetermined distance and three-dimensionally displays the operable item.

3. The image processing apparatus according to claim 2, wherein said display control unit two-dimensionally displays the operation candidate item if the detected distance is not smaller than the second predetermined distance.

4. The image processing apparatus in accordance with claim 1, wherein the display control unit is configured to change a display on the screen so that no operation candidate items are displayed if the detected distance is larger than the first predetermined threshold distance.

5. An image pickup apparatus comprising: an image pickup unit configured to pick up an object to acquire image data of the object; and an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, wherein said image processing apparatus comprises: a distance detection unit configured to detect a distance between the screen and the operation element to obtain a detected distance; a display control unit configured to display an operation candidate item on the screen if the detected distance becomes not larger than a predetermined threshold distance and, to change a display color of the operation candidate item depending on the detected distance such that the display color is darker if the detected distance is smaller, wherein said display control unit is configured to switch the operation candidate item to the operation item if the operation candidate item is touched down by the operation element, wherein the display control unit is configured to delete the display of the operation candidate item if the detected distance becomes larger than the first predetermined threshold distance; and wherein when the operation candidate item is displayed on the screen and the detected distance is not smaller than at least a second predetermined distance, which is smaller than the first predetermined threshold distance, the operation candidate item is not operable.

6. A method of controlling an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, comprising: detecting a distance between the screen and the operation element by a detection sensor to obtain a detected distance; displaying an operation candidate item on the screen if the detected distance becomes not larger than a first predetermined threshold distance, changing a display color of the operation candidate item depending on the detected distance such that the display color is darker if the detected distance is smaller, switching, in the displaying step, the operation candidate item to the operation item if the operation candidate item is touched down by the operation element, deleting the display of the operation candidate item if the detected distance becomes larger than the first predetermined threshold distance; and wherein when the operation candidate item is displayed on the screen and the detected distance is not smaller than at least a second predetermined distance, which is smaller than the first predetermined threshold distance, the operation candidate item is not operable.

7. A non-transitory computer-readable storage medium storing a computer-executable control program for causing a computer to execute a method of controlling an image processing apparatus that displays an image on a screen based on image data, and displays an operation item for use in inputting an operation for causing the image processing apparatus to perform processing concerning the image, on the screen, to thereby perform processing associated with the operation item when the operation item is operated by an operation element, wherein the method comprises: detecting a distance between the screen and the operation element by a detection sensor to obtain a detected distance; displaying an operation candidate item on the screen if the detected distance becomes not larger than a first predetermined threshold distance, changing a display color of the operation candidate item depending on the detected distance such that the display color is darker if the detected distance is smaller, switching, in the displaying step, the operation candidate item to the operation item if the operation candidate item is touched down by the operation element, deleting the display of the operation candidate item if the detected distance becomes larger than the first predetermined threshold distance; and wherein when the operation candidate item is displayed on the screen and the detected distance is not smaller than at least a second predetermined distance, which is smaller than the first predetermined threshold distance, the operation candidate item is not operable.

\* \* \* \* \*